US012701142B1

(12) United States Patent
Gorman et al.

(10) Patent No.: US 12,701,142 B1
(45) **Date of Patent: *Aug. 4, 2026**

(54) DISTRIBUTING RESOURCES THROUGH SECURE ALTERNATE CHANNELS

(71) Applicant: THE HUNTINGTON NATIONAL BANK, Columbus, OH (US)

(72) Inventors: Timothy Gorman, Columbus, OH (US); Gregory A. McCracken, Columbus, OH (US); Anil Chowdary Pathi, Columbus, OH (US); Doug Henderson, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/211,669

(22) Filed: May 19, 2025

(51) Int. Cl.
H04L 9/40 (2022.01)

(52) U.S. Cl.
CPC .............. H04L 63/18 (2013.01); H04L 63/10 (2013.01)

(58) Field of Classification Search
None
See application file for complete search history.

(56) References Cited

U.S. PATENT DOCUMENTS 5,150,361 A * 9/1992 Wieczorek ........... H04B 1/1615
455/343.1
5,978,840 A * 11/1999 Nguyen .............. H04L 63/0823
705/79

6,480,505 B1 * 11/2002 Johansson ........... H04W 72/121
370/329
6,658,568 B1 * 12/2003 Ginter ................... G06T 1/0021
380/231
6,763,372 B1 * 7/2004 Dani .................... H04L 12/1827
709/204

(Continued)

FOREIGN PATENT DOCUMENTS

CN 113515661 A * 10/2021 ........... G06F 18/253
CN 118842771 A * 10/2024 ............. H04L 43/08

OTHER PUBLICATIONS

Google Patents Translation of CN118842771, pp. 1-10 (Year: 2024).*

(Continued)

*Primary Examiner* — Luu T Pham
*Assistant Examiner* — James J Wilcox
(74) *Attorney, Agent, or Firm* — Kilpatrick Townsend & Stockton LLP

(57) ABSTRACT

A system can distribute resources through an alternate resource distribution channel based on information received in a request to distribute resources through a first resource distribution channel. For example, the system can receive a file comprising an image of a request to distribute, through a first channel, a resource from a user to a recipient and a set of pre-extracted data from the image comprising a quantity of the resource. The system can extract values from the image including a name of the recipient and an address of the recipient. The system can determine, based on the name and the address, that the recipient is an organization. The system can determine an alternate channel to distribute the resource from the user to the recipient. The system can distribute the resource from the user to the recipient through the alternate channel.

14 Claims, 7 Drawing Sheets

(56) References Cited

U.S. PATENT DOCUMENTS

| | | | | |
|---|---|---|---|---|
| 6,934,858 B2* | 8/2005 | Woodhill | H04L 63/08 | 726/5 |
| 6,999,943 B1* | 2/2006 | Johnson | G06Q 30/06 | 705/37 |
| 7,260,601 B1* | 8/2007 | Day | H04H 60/66 | 370/236 |
| 7,558,242 B1* | 7/2009 | Hazenson | H04J 3/0602 | 370/350 |
| 8,843,148 B2* | 9/2014 | Koudouridis | H04W 28/16 | 455/452.2 |
| 9,225,609 B2* | 12/2015 | McNaughton | H04L 41/5003 | |
| 9,406,057 B2* | 8/2016 | Hammad | G08B 5/229 | |
| 9,479,341 B2* | 10/2016 | Bugenhagen | H04M 7/0084 | |
| 9,621,361 B2* | 4/2017 | Bugenhagen | H04L 12/14 | |
| 10,015,795 B1* | 7/2018 | Wolf | H04W 76/11 | |
| 10,623,275 B1* | 4/2020 | Castinado | G06Q 20/40 | |
| 10,657,233 B1* | 5/2020 | Wallbom | G06F 21/31 | |
| 10,797,860 B1* | 10/2020 | Dennis | H04L 9/14 | |
| 10,812,981 B1* | 10/2020 | Sokolov | H04W 12/08 | |
| 10,959,100 B1* | 3/2021 | Nelson | H04L 63/18 | |
| 10,992,606 B1* | 4/2021 | Mitchell | H04L 67/34 | |
| 11,003,746 B1* | 5/2021 | Vashishtha | H04L 63/1408 | |
| 11,153,400 B1* | 10/2021 | Bascom | H04L 67/10 | |
| 11,206,664 B2* | 12/2021 | Brown | H04W 56/001 | |
| 11,496,483 B1* | 11/2022 | Babani | G06F 21/6218 | |
| 11,539,817 B1* | 12/2022 | Perez | H04L 63/08 | |
| 11,551,221 B2* | 1/2023 | Srinivasan | G06Q 20/3224 | |
| 11,595,215 B1* | 2/2023 | Madden | H04L 63/0807 | |
| 11,595,389 B1* | 2/2023 | Madden | H04L 9/0643 | |
| 11,606,210 B1* | 3/2023 | Madden | H04L 63/10 | |
| 12,081,604 B1* | 9/2024 | Hinds | H04L 65/80 | |
| 12,238,101 B2* | 2/2025 | Pattar | H04L 63/08 | |
| 12,475,459 B1* | 11/2025 | Kumar | G06Q 20/401 | |
| 2002/0091536 A1* | 7/2002 | Seaman | G06Q 30/08 | 705/28 |
| 2002/0099612 A1* | 7/2002 | Seaman | G06Q 10/087 | 705/26.3 |
| 2003/0028451 A1* | 2/2003 | Ananian | G06Q 30/0615 | 705/26.42 |
| 2003/0028481 A1* | 2/2003 | Flitcroft | G06Q 20/34 | 705/39 |
| 2003/0055738 A1* | 3/2003 | Alie | G06Q 20/3229 | 705/26.1 |
| 2003/0117953 A1* | 6/2003 | Kinahan | H04W 28/26 | 370/437 |
| 2003/0131073 A1* | 7/2003 | Lucovsky | H04L 67/306 | 709/219 |
| 2003/0152083 A1* | 8/2003 | Nagata | H04W 28/02 | 370/335 |
| 2003/0156624 A1* | 8/2003 | Koslar | H04B 1/69 | 375/295 |
| 2004/0032857 A1* | 2/2004 | Tannan | H04W 24/00 | 370/351 |
| 2004/0181376 A1* | 9/2004 | Fables | G06N 3/004 | 703/6 |
| 2005/0208949 A1* | 9/2005 | Chiueh | H04W 28/20 | 455/452.2 |
| 2006/0012491 A1* | 1/2006 | Mahowald | H04Q 9/00 | 340/870.02 |
| 2006/0080263 A1* | 4/2006 | Willis | H04L 63/10 | 705/76 |
| 2006/0117378 A1* | 6/2006 | Tam | G06Q 30/06 | 726/3 |
| 2006/0165060 A1* | 7/2006 | Dua | G06Q 20/322 | 705/76 |
| 2006/0217123 A1* | 9/2006 | Ishii | H04W 72/52 | 455/450 |
| 2006/0253458 A1* | 11/2006 | Dixon | H04L 63/1483 | |
| 2006/0277145 A1* | 12/2006 | Raccah | G06Q 40/04 | 705/40 |
| 2007/0054645 A1* | 3/2007 | Pan | H04W 24/08 | 455/266 |
| 2008/0009268 A1* | 1/2008 | Ramer | H04L 67/303 | 707/E17.109 |
| 2008/0120240 A1* | 5/2008 | Ginter | H04L 63/16 | 705/51 |
| 2008/0222267 A1* | 9/2008 | Horn | H04L 67/1031 | 709/217 |
| 2008/0294496 A1* | 11/2008 | Hall | G06Q 10/06 | 705/7.31 |
| 2008/0310479 A1* | 12/2008 | Koslar | H04W 52/267 | 375/295 |
| 2009/0204524 A1* | 8/2009 | McGeorge | G06Q 40/00 | 705/35 |
| 2009/0276364 A1* | 11/2009 | Laia | G06Q 40/12 | 705/26.1 |
| 2010/0027426 A1* | 2/2010 | Nair | H04W 28/16 | 370/254 |
| 2010/0153704 A1* | 6/2010 | Winslow | H04L 63/10 | 713/153 |
| 2010/0214939 A1* | 8/2010 | Ryan | H04W 24/08 | 370/252 |
| 2010/0238878 A1* | 9/2010 | Jang | H04L 5/0037 | 370/329 |
| 2010/0250497 A1* | 9/2010 | Redlich | G06Q 10/06 | 707/661 |
| 2011/0029436 A1* | 2/2011 | Norvell | H04L 63/18 | 705/67 |
| 2011/0197239 A1* | 8/2011 | Schlack | H04N 21/2393 | 725/95 |
| 2011/0219035 A1* | 9/2011 | Korsunsky | G06F 21/00 | 707/E17.005 |
| 2011/0289536 A1* | 11/2011 | Poder | H04N 21/658 | 725/95 |
| 2011/0295988 A1* | 12/2011 | Le Jouan | G06F 21/31 | 709/223 |
| 2011/0302083 A1* | 12/2011 | Bhinder | G06Q 20/40 | 705/44 |
| 2012/0150742 A1* | 6/2012 | Poon | H04W 4/24 | 705/44 |
| 2012/0182867 A1* | 7/2012 | Farrag | H04J 3/16 | 370/230 |
| 2012/0284195 A1* | 11/2012 | McMillen | G06Q 20/3223 | 705/41 |
| 2012/0324242 A1* | 12/2012 | Kirsch | G06Q 20/384 | 713/189 |
| 2013/0070708 A1* | 3/2013 | Bai | H04W 72/23 | 370/329 |
| 2013/0170449 A1* | 7/2013 | Chen | H04W 72/23 | 370/329 |
| 2013/0191904 A1* | 7/2013 | Piliouras | G06Q 30/0269 | 726/7 |
| 2013/0198815 A1* | 8/2013 | Piliouras | G06Q 30/0207 | 726/4 |
| 2013/0254117 A1* | 9/2013 | von Mueller | G06Q 20/3829 | 705/71 |
| 2013/0276042 A1* | 10/2013 | Savastianov | H04L 65/611 | 725/95 |
| 2013/0291036 A1* | 10/2013 | Yamagishi | H04L 65/61 | 725/109 |
| 2014/0164223 A1* | 6/2014 | Grigg | G06Q 20/425 | 705/39 |
| 2014/0222667 A1* | 8/2014 | Abhyanker | G06Q 10/087 | 726/28 |
| 2014/0242999 A1* | 8/2014 | Goshen | H04L 43/0823 | 455/445 |
| 2014/0279431 A1* | 9/2014 | Holman | G06Q 20/08 | 705/39 |
| 2014/0279435 A1* | 9/2014 | Holman | G06Q 20/405 | 705/39 |
| 2014/0280952 A1* | 9/2014 | Shear | H04L 63/10 | 709/226 |
| 2014/0282586 A1* | 9/2014 | Shear | G06F 9/5072 | 718/104 |
| 2014/0314389 A1* | 10/2014 | Mese | H04N 21/8456 | 386/241 |
| 2014/0358783 A1* | 12/2014 | Mansur | G06Q 20/10 | 705/44 |

(56) References Cited

U.S. PATENT DOCUMENTS

| | | | | |
|---|---|---|---|---|
| 2015/0106164 | A1* | 4/2015 | Thibeault | G06Q 10/0637 |
| | | | | 705/7.36 |
| 2015/0150107 | A1* | 5/2015 | Piliouras | H04L 63/102 |
| | | | | 726/7 |
| 2015/0163206 | A1* | 6/2015 | McCarthy | G06F 21/6227 |
| | | | | 726/4 |
| 2015/0188949 | A1* | 7/2015 | Mahaffey | H04W 12/37 |
| | | | | 726/1 |
| 2015/0193773 | A1* | 7/2015 | Mattioli | G06Q 20/407 |
| | | | | 705/18 |
| 2015/0206083 | A1* | 7/2015 | Chen | G06Q 50/06 |
| | | | | 705/7.23 |
| 2015/0269607 | A1* | 9/2015 | Steube | G06Q 30/0244 |
| | | | | 705/14.43 |
| 2015/0294315 | A1* | 10/2015 | Agrawal | G06Q 20/3278 |
| | | | | 705/41 |
| 2015/0310188 | A1* | 10/2015 | Ford | H04L 63/101 |
| | | | | 726/28 |
| 2016/0034305 | A1* | 2/2016 | Shear | G06F 9/50 |
| | | | | 707/722 |
| 2016/0087769 | A1* | 3/2016 | Wild | H04L 5/0057 |
| | | | | 370/329 |
| 2016/0104145 | A1* | 4/2016 | Critchley | G06Q 20/36 |
| | | | | 705/41 |
| 2016/0198475 | A1* | 7/2016 | Uchiyama | H04B 17/11 |
| | | | | 370/329 |
| 2016/0225006 | A1* | 8/2016 | Chen | G06Q 30/0224 |
| 2016/0260067 | A1* | 9/2016 | Holman | G06Q 20/22 |
| 2016/0262164 | A1* | 9/2016 | Gresset | H04W 72/541 |
| 2016/0267527 | A1* | 9/2016 | Flood | G06Q 30/0246 |
| 2016/0275513 | A1* | 9/2016 | Kumar | G06Q 20/354 |
| 2016/0275514 | A1* | 9/2016 | Kumar | G06Q 20/354 |
| 2017/0019396 | A1* | 1/2017 | Bettenburg | H04L 63/0428 |
| 2017/0041296 | A1* | 2/2017 | Ford | G06F 21/64 |
| 2017/0206717 | A1* | 7/2017 | Kühnapfel | G06Q 40/08 |
| 2017/0214699 | A1* | 7/2017 | Johnsrud | H04L 9/3236 |
| 2017/0244608 | A1* | 8/2017 | Reaux-Savonte | G06N 20/00 |
| 2017/0337354 | A1* | 11/2017 | Drey | G06Q 50/184 |
| 2017/0346851 | A1* | 11/2017 | Drake | H04L 9/0838 |
| 2017/0366422 | A1* | 12/2017 | Castinado | H04W 4/02 |
| 2018/0020002 | A1* | 1/2018 | Duca | H04L 63/0236 |
| 2018/0025442 | A1* | 1/2018 | Isaacson | G06Q 30/0613 |
| | | | | 705/26.62 |
| 2018/0183780 | A1* | 6/2018 | Neumann | H04L 63/0823 |
| 2018/0197031 | A1* | 7/2018 | Kurian | G08B 21/0297 |
| 2018/0232672 | A1* | 8/2018 | Greene | G06F 7/08 |
| 2018/0232995 | A1* | 8/2018 | Greene | G07F 17/3269 |
| 2018/0246983 | A1* | 8/2018 | Rathod | G06F 16/972 |
| 2018/0249509 | A1* | 8/2018 | Yi | H04L 67/12 |
| 2018/0255000 | A1* | 9/2018 | Castinado | G06Q 40/02 |
| 2018/0290073 | A1* | 10/2018 | Brown | B01D 3/143 |
| 2018/0307859 | A1* | 10/2018 | LaFever | H04L 63/20 |
| 2018/0310339 | A1* | 10/2018 | Li | H04W 74/0808 |
| 2018/0322473 | A1* | 11/2018 | Castinado | G06Q 20/36 |
| 2018/0359244 | A1* | 12/2018 | Cockerill | H04L 63/105 |
| 2018/0359811 | A1* | 12/2018 | Verzun | H04L 12/28 |
| 2018/0374065 | A1* | 12/2018 | Wolf | G06Q 20/045 |
| 2019/0028691 | A1* | 1/2019 | Hinds | H04N 21/4518 |
| 2019/0036629 | A1* | 1/2019 | Sundaresan | H04J 11/0026 |
| 2019/0036864 | A1* | 1/2019 | Reuss | H04L 51/52 |
| 2019/0066106 | A1* | 2/2019 | Willis | G06Q 20/042 |
| 2019/0068261 | A1* | 2/2019 | Priyanto | H04L 1/189 |
| 2019/0102762 | A1* | 4/2019 | Wolf | G07F 19/20 |
| 2019/0108062 | A1* | 4/2019 | Wu | G06F 9/547 |
| 2019/0109853 | A1* | 4/2019 | Henry | H04L 63/102 |
| 2019/0132336 | A1* | 5/2019 | Sims | H04L 63/1425 |
| 2019/0141682 | A1* | 5/2019 | Tang | H04W 74/006 |
| 2019/0158390 | A1* | 5/2019 | Ahuja | H04L 63/102 |
| 2019/0174188 | A1* | 6/2019 | Li | H04N 21/4826 |
| 2019/0230422 | A1* | 7/2019 | Hajimusa | H04W 24/08 |
| 2019/0311277 | A1* | 10/2019 | Kursun | G06N 3/08 |
| 2019/0318333 | A1* | 10/2019 | Castinado | G06Q 20/16 |
| 2019/0327135 | A1* | 10/2019 | Johnson | H04W 4/70 |
| 2019/0327226 | A1* | 10/2019 | Brown | G06F 21/31 |
| 2019/0356641 | A1* | 11/2019 | Isaacson | G06Q 30/0625 |
| 2019/0364492 | A1* | 11/2019 | Azizi | H04L 67/12 |
| 2019/0380146 | A1* | 12/2019 | Smely | H04W 74/0808 |
| 2019/0386969 | A1* | 12/2019 | Verzun | G06F 21/606 |
| 2020/0021620 | A1* | 1/2020 | Puratheppparambil | |
| | | | | H04L 63/205 |
| 2020/0042920 | A1* | 2/2020 | Moorthy | G06Q 30/0202 |
| 2020/0053111 | A1* | 2/2020 | Jakobsson | H04L 63/1416 |
| 2020/0076813 | A1* | 3/2020 | Felice-Steele | H04L 63/18 |
| 2020/0090092 | A1* | 3/2020 | Cantley | G06Q 10/06315 |
| 2020/0160244 | A1* | 5/2020 | Brandt | G06Q 10/06312 |
| 2020/0167205 | A1* | 5/2020 | Guim Bernat | H04L 41/5054 |
| 2020/0213002 | A1* | 7/2020 | Garman | H04B 7/24 |
| 2020/0226558 | A1* | 7/2020 | Castinado | H04L 67/1095 |
| 2020/0234283 | A1* | 7/2020 | Greiche | H04L 9/0825 |
| 2020/0296082 | A1* | 9/2020 | Killoran, Jr. | G06F 21/313 |
| 2020/0334735 | A1* | 10/2020 | Scully | G06Q 30/0631 |
| 2020/0351852 | A1* | 11/2020 | McConnell | H04W 72/044 |
| 2020/0366366 | A1* | 11/2020 | Charrat | H04B 7/2041 |
| 2020/0387602 | A1* | 12/2020 | Kursun | G06F 21/554 |
| 2020/0387752 | A1* | 12/2020 | Kursun | G06F 16/9035 |
| 2020/0387833 | A1* | 12/2020 | Kursun | G06N 20/20 |
| 2020/0387971 | A1* | 12/2020 | King | G06N 3/006 |
| 2020/0389470 | A1* | 12/2020 | Kursun | G06N 20/00 |
| 2020/0394332 | A1* | 12/2020 | Jakobsson | G06F 16/24573 |
| 2021/0035123 | A1* | 2/2021 | Agrawal | G06Q 20/4012 |
| 2021/0042712 | A1* | 2/2021 | Crowley | G06Q 20/381 |
| 2021/0045136 | A1* | 2/2021 | Ljung | H04W 72/12 |
| 2021/0056520 | A1* | 2/2021 | Thomsen | G06Q 20/027 |
| 2021/0058395 | A1* | 2/2021 | Jakobsson | H04L 67/306 |
| 2021/0067511 | A1* | 3/2021 | Smith | H04L 9/3268 |
| 2021/0133670 | A1* | 5/2021 | Cella | G06N 3/044 |
| 2021/0157312 | A1* | 5/2021 | Cella | G01M 13/045 |
| 2021/0160281 | A1* | 5/2021 | Hallaji | H04L 63/1491 |
| 2021/0182996 | A1* | 6/2021 | Cella | G06Q 10/0631 |
| 2021/0191766 | A1* | 6/2021 | Stribady | H04L 63/123 |
| 2021/0218710 | A1* | 7/2021 | Fallah | H04L 9/14 |
| 2021/0218858 | A1* | 7/2021 | Mavani | G06Q 20/0425 |
| 2021/0243191 | A1* | 8/2021 | Jain | G06N 5/04 |
| 2021/0256524 | A1* | 8/2021 | Willis | G06Q 20/4016 |
| 2021/0258960 | A1* | 8/2021 | Yan | H04L 5/001 |
| 2021/0304282 | A1* | 9/2021 | Dintenfass | H04L 63/08 |
| 2022/0011862 | A1* | 1/2022 | Chauhan | A61B 5/378 |
| 2022/0011863 | A1* | 1/2022 | Chauhan | A61B 5/117 |
| 2022/0013221 | A1* | 1/2022 | Chauhan | G06Q 20/405 |
| 2022/0028513 | A1* | 1/2022 | Gangaikondan-Lyer | |
| | | | | G06Q 30/04 |
| 2022/0036302 | A1* | 2/2022 | Cella | H04L 67/1097 |
| 2022/0050921 | A1* | 2/2022 | LaFever | G16H 10/60 |
| 2022/0051207 | A1* | 2/2022 | King | G06Q 20/108 |
| 2022/0108262 | A1* | 4/2022 | Cella | G05B 17/02 |
| 2022/0116736 | A1* | 4/2022 | Williams | G16H 50/20 |
| 2022/0131653 | A1* | 4/2022 | Ma | H04L 1/1822 |
| 2022/0187847 | A1* | 6/2022 | Cella | G06Q 10/06395 |
| 2022/0197306 | A1* | 6/2022 | Cella | H04L 63/1441 |
| 2022/0245574 | A1* | 8/2022 | Cella | G06Q 10/087 |
| 2022/0253963 | A1* | 8/2022 | Fowler | G06Q 50/205 |
| 2022/0261461 | A1* | 8/2022 | Bondugula | H04L 9/3239 |
| 2022/0261935 | A1* | 8/2022 | Hoeflinger | G06Q 50/01 |
| 2022/0266451 | A1* | 8/2022 | Cristache | G05D 1/0246 |
| 2022/0319143 | A1* | 10/2022 | Wyle | G06V 10/82 |
| 2022/0327521 | A1* | 10/2022 | Thomsen | G06Q 20/401 |
| 2022/0342951 | A1* | 10/2022 | Doiron | G06F 21/6227 |
| 2022/0366494 | A1* | 11/2022 | Cella | H04L 9/3231 |
| 2022/0391788 | A1* | 12/2022 | Liu | G06Q 10/0637 |
| 2023/0054446 | A1* | 2/2023 | LaFever | H04W 12/75 |
| 2023/0064944 | A1* | 3/2023 | Proud | G06Q 20/405 |
| 2023/0078448 | A1* | 3/2023 | Cella | G06Q 10/06311 |
| | | | | 705/7.13 |
| 2023/0083724 | A1* | 3/2023 | Cella | G06Q 30/0206 |
| | | | | 705/28 |
| 2023/0087282 | A1* | 3/2023 | Liu | H04W 76/15 |
| | | | | 370/328 |
| 2023/0098602 | A1* | 3/2023 | Cella | B25J 9/1674 |
| | | | | 700/248 |
| 2023/0102048 | A1* | 3/2023 | Cella | B25J 9/1661 |
| | | | | 700/248 |

(56) References Cited

U.S. PATENT DOCUMENTS

| | | | | |
|---|---|---|---|---|
| 2023/0123322 | A1* | 4/2023 | Cella | G06Q 10/067 700/29 |
| 2023/0128813 | A1* | 4/2023 | Babani | G06F 21/6245 726/4 |
| 2023/0173395 | A1* | 6/2023 | Cella | G06N 3/0455 463/25 |
| 2023/0179955 | A1* | 6/2023 | Williams | A61B 5/4833 455/456.1 |
| 2023/0198953 | A1* | 6/2023 | Castinado | H04W 76/10 455/411 |
| 2023/0206329 | A1* | 6/2023 | Cella | G06Q 20/405 |
| 2023/0214925 | A1* | 7/2023 | Cella | G06Q 30/06 705/37 |
| 2023/0216947 | A1* | 7/2023 | Bernardi | H04L 67/10 713/150 |
| 2023/0222454 | A1* | 7/2023 | Cella | G06N 7/01 705/28 |
| 2023/0222531 | A1* | 7/2023 | Cella | G06Q 10/0631 705/7.31 |
| 2023/0230091 | A1* | 7/2023 | Vaughn | G06Q 20/4016 705/71 |
| 2023/0232282 | A1* | 7/2023 | Belur Ramachandra | H04W 28/16 370/252 |
| 2023/0246814 | A1* | 8/2023 | Fromm | H04L 63/0281 713/171 |
| 2023/0254330 | A1* | 8/2023 | Singh | G06F 21/57 726/23 |
| 2023/0262059 | A1* | 8/2023 | Dash | G06F 18/214 726/26 |
| 2023/0284178 | A1* | 9/2023 | Parker | G01S 5/01 455/456.1 |
| 2023/0316169 | A1* | 10/2023 | Albero | G06N 10/60 705/7.12 |
| 2023/0379114 | A1* | 11/2023 | Yu | H04L 5/0007 |
| 2023/0396601 | A1* | 12/2023 | Manikantan | H04L 63/104 |
| 2023/0403730 | A1* | 12/2023 | Shen | H04W 72/25 |
| 2024/0007414 | A1* | 1/2024 | Jain | G06F 9/5088 |
| 2024/0144141 | A1* | 5/2024 | Cella | G06Q 30/0206 |
| 2024/0242224 | A1* | 7/2024 | Chistolini | G06Q 20/02 |
| 2024/0429985 | A1* | 12/2024 | Kim | H04W 24/02 |
| 2024/0430918 | A1* | 12/2024 | Hosseini | H04B 7/0628 |
| 2025/0016520 | A1* | 1/2025 | Williams | A61B 5/7264 |
| 2025/0016521 | A1* | 1/2025 | Williams | G16H 40/67 |
| 2025/0023875 | A1* | 1/2025 | Charlson | H04L 63/101 |
| 2025/0054008 | A1* | 2/2025 | Cella | G06N 5/043 |
| 2025/0079886 | A1* | 3/2025 | Hämäläinen | H02J 7/00032 |
| 2025/0111356 | A1* | 4/2025 | Kostovski | G06F 21/31 |
| 2025/0139670 | A1* | 5/2025 | Clawar | G06Q 50/16 |
| 2025/0209298 | A1* | 6/2025 | Agarwal | G06N 3/04 |
| 2025/0217758 | A1* | 7/2025 | Jaiswal | G06Q 10/087 |
| 2025/0254495 | A1* | 8/2025 | Williams | A61B 5/0022 |

OTHER PUBLICATIONS

Almutairi et al "A Distributed Access Control Architecture for Cloud Computing," IEEE Software, pp. 36-44 (Year: 2012).*
Kulkarni et al "Resource Allocation and Secure Channel Model for Service-Dependent Mobile Edge Computing," IEEE, pp. 958-964 (Year: 2024).*
Google Patents Translation of CN113515661A, pp. 1-12 ( (Year: 2021).*
Gorski et al "A2iA Check Reader: A Family of Bank Check Recognition Systems," pp. 1-4 (Year: 1999).*
Liwicki et al "Combining On-Line and Off-Line Systems for Handwriting Recognition," IEEE Computer Society, pp. 1-5 (Year: 2007).*
Thakur et al "Automatic Imagery Bank Cheque Data Extraction based on Machine Learning Approaches: A Comprehensive Study," pp. 30543-30598 (Year: 2023).*
Ghosh et al "Handwritten Text Recognition in Bank Cheques," IEEE, pp. 1-6 (Year: 2018).*
Shridhar et al "Comprehensive Check Image Reader," IEEE Computer Society, pp. 1-9 (Year: 2007).*

* cited by examiner

502
Determine Recipient is an Organization

504
Determine Types of Resource Repository Recipient is Configured to Accept Distributions From

506
Generate Second User Resource Repository of a Second Type

508
Distribute Resources From the Second User Repository to the Recipient through Alternative Resource Distribution Channel

602
Store Distribution
Details in User
Distribution History

604
Calculate Metrics
From User
Distribution History

606
Distribute Resource
Through Alternate
Distribution Channel
Based on Metrics
Meeting Criteria

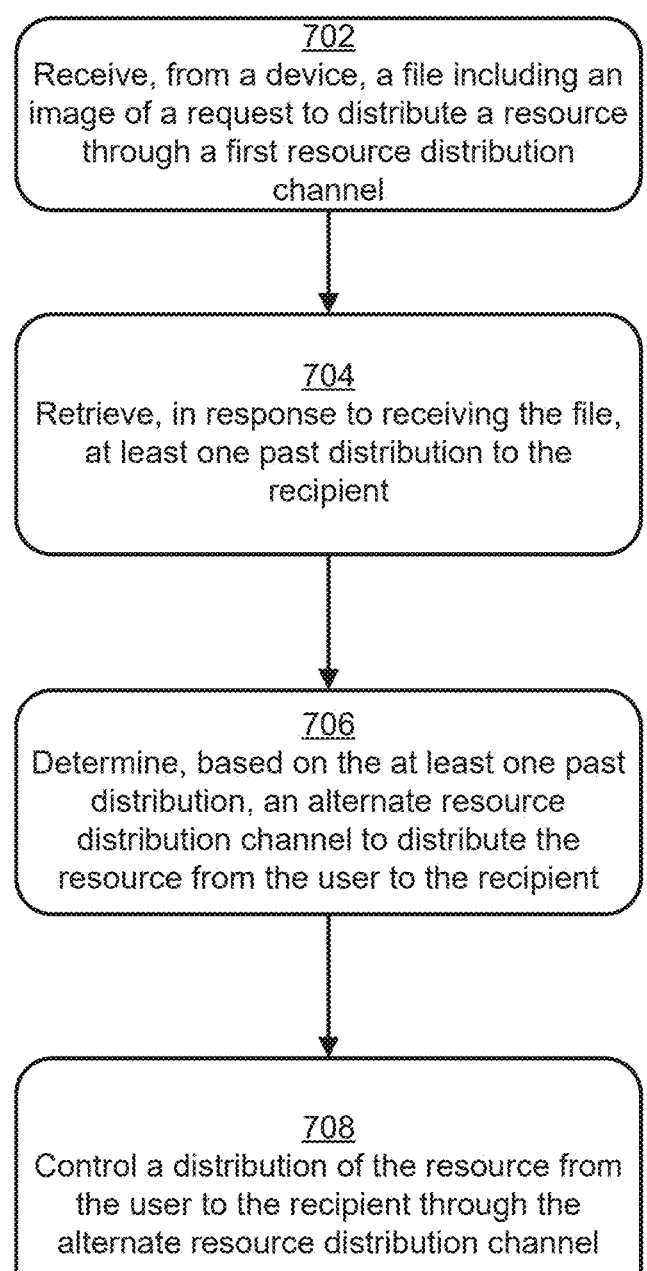

702
Receive, from a device, a file including an image of a request to distribute a resource through a first resource distribution channel 704
Retrieve, in response to receiving the file, at least one past distribution to the recipient 706
Determine, based on the at least one past distribution, an alternate resource distribution channel to distribute the resource from the user to the recipient 708
Control a distribution of the resource from the user to the recipient through the alternate resource distribution channel

*FIG. 7*

DISTRIBUTING RESOURCES THROUGH SECURE ALTERNATE CHANNELS

TECHNICAL FIELD

This disclosure relates generally to resource distribution. More specifically, but not by way of limitation, this disclosure relates to techniques for identifying secure alternate resource distribution channels and rerouting distributions through identified secure alternate resource distribution channels.

BACKGROUND

Resource distribution systems often control valuable or sensitive resources. Many resource distribution systems were created before the advent of computers. Resource distribution systems have been adopting digital platforms. But a written request to distribute resources may continue to be used. Written requests to distribute resources indicate the source of the resources, the destination of the resources, and are signed by the sender to authorize the distribution. Written requests are then mailed or hand delivered between resource distribution systems. Or, the written requests are scanned as digital image files. The digital image files may be encrypted. But, the information contained on written requests to distribute resources is still exposed in transit and in waste.

SUMMARY

According to one example, a system can include a processor and a memory communicatively coupled to the processor. The memory can include instructions that configure the processor to perform operations. The operations may include receiving, from a device, a file comprising an image of a request to distribute, through a first resource distribution channel, a resource from a user to a recipient and a set of pre-extracted data from the image comprising at least a quantity of the resource. The operations may further include extracting, using a trained machine learning model, a plurality of values from the image including a name of the recipient and an address of the recipient. The name and the address can be determined based on determining a relationship between a first location of a first value in the image and a second location of a second value in the image. The operations may further include determining, based on the name of the recipient and the address of the recipient, that the recipient is an organization and determining, in response to determining that the recipient is the organization, an alternate resource distribution channel to distribute the resource from the user to the recipient. The operations may further include distributing the resource from the user to the recipient through the alternate resource distribution channel in response to determining the alternate resource distribution channel.

According to one example, a method may involve receiving, from a device, a file including an image of a request to distribute, through a first resource distribution channel, a resource from a user to a recipient and a set of pre-extracted data from the image comprising at least a quantity of the resource. The method may further involve extracting, using a trained machine learning model, a plurality of values from the image including a name of the recipient and an address of the recipient. The name and the address can be determined based on a relationship between a first location of a first value in the image and a second location of a second value in the image. The method may further involve determining, based on the name of the recipient and the address of the recipient, that the recipient is an organization and determining, in response to determining that the recipient is the organization, an alternate resource distribution channel to distribute the resource from the user to the recipient. The method may further involve distributing the resource from the user to the recipient, through the alternate resource distribution channel, in response to determining the alternate resource distribution channel.

In a further example, a non-transitory computer-readable medium includes instructions that are executable by a processor for causing the processor to perform operations. The operations may include receiving, from a device, a file comprising an image of a request to distribute, through a first resource distribution channel, a resource from a user to a recipient and a set of pre-extracted data from the image comprising at least a quantity of the resource. The operations may further include extracting, using a trained machine learning model, a plurality of values from the image including a name of the recipient and an address of the recipient. The name and the address can be determined based on determining a relationship between a first location of a first value in the image and a second location of a second value in the image. The operations may further include determining, based on the name of the recipient and the address of the recipient, that the recipient is an organization and determining, in response to determining that the recipient is the organization, an alternate resource distribution channel to distribute the resource from the user to the recipient. The operations may further include distributing the resource from the user to the recipient through the alternate resource distribution channel in response to determining the alternate resource distribution channel.

According to one example, a system can include a processor and a memory communicatively coupled to the processor. The memory can include instructions that configure the processor to perform operations. The operations may include receiving, from a device, a file including an image of a request to distribute, through a first resource distribution channel, a resource from a user to a recipient and a set of pre-extracted data from the image comprising at least a quantity of the resource. The operations may further include retrieving, in response to receiving the file, at least one past distribution to the recipient and determining, based on the at least one past distribution, an alternate resource distribution channel to distribute the resource from the user to the recipient. The operations may further include controlling a distribution of the resource from the user to the recipient through the alternate resource distribution channel in response to determining the alternate resource distribution channel.

According to one example, a method may involve receiving, from a device, a file including an image of a request to distribute, through a first resource distribution channel, a resource from a user to a recipient and a set of pre-extracted data from the image comprising at least a quantity of the resource. The method may further involve retrieving, in response to receiving the file, at least one past distribution to the recipient and determining, based on the at least one past distribution, an alternate resource distribution channel to distribute the resource from the user to the recipient. The method may further involve controlling a distribution of the resource from the user to the recipient through the alternate resource distribution channel in response to determining the alternate resource distribution channel.

In a further example, a non-transitory computer-readable medium includes instructions that are executable by a processor for causing the processor to perform operations. The operations may include receiving, from a device, a file including an image of a request to distribute, through a first resource distribution channel, a resource from a user to a recipient and a set of pre-extracted data from the image comprising at least a quantity of the resource. The operations may further include retrieving, in response to receiving the file, at least one past distribution to the recipient and determining, based on the at least one past distribution, an alternate resource distribution channel to distribute the resource from the user to the recipient. The operations may further include controlling a distribution of the resource from the user to the recipient through the alternate resource distribution channel in response to determining the alternate resource distribution channel.

BRIEF DESCRIPTION OF THE DRAWINGS

FIG. 7 is a flowchart of distributing resources using an alternate resource distribution channel based on past distributions according to some examples.

DETAILED DESCRIPTION

Figure 1:
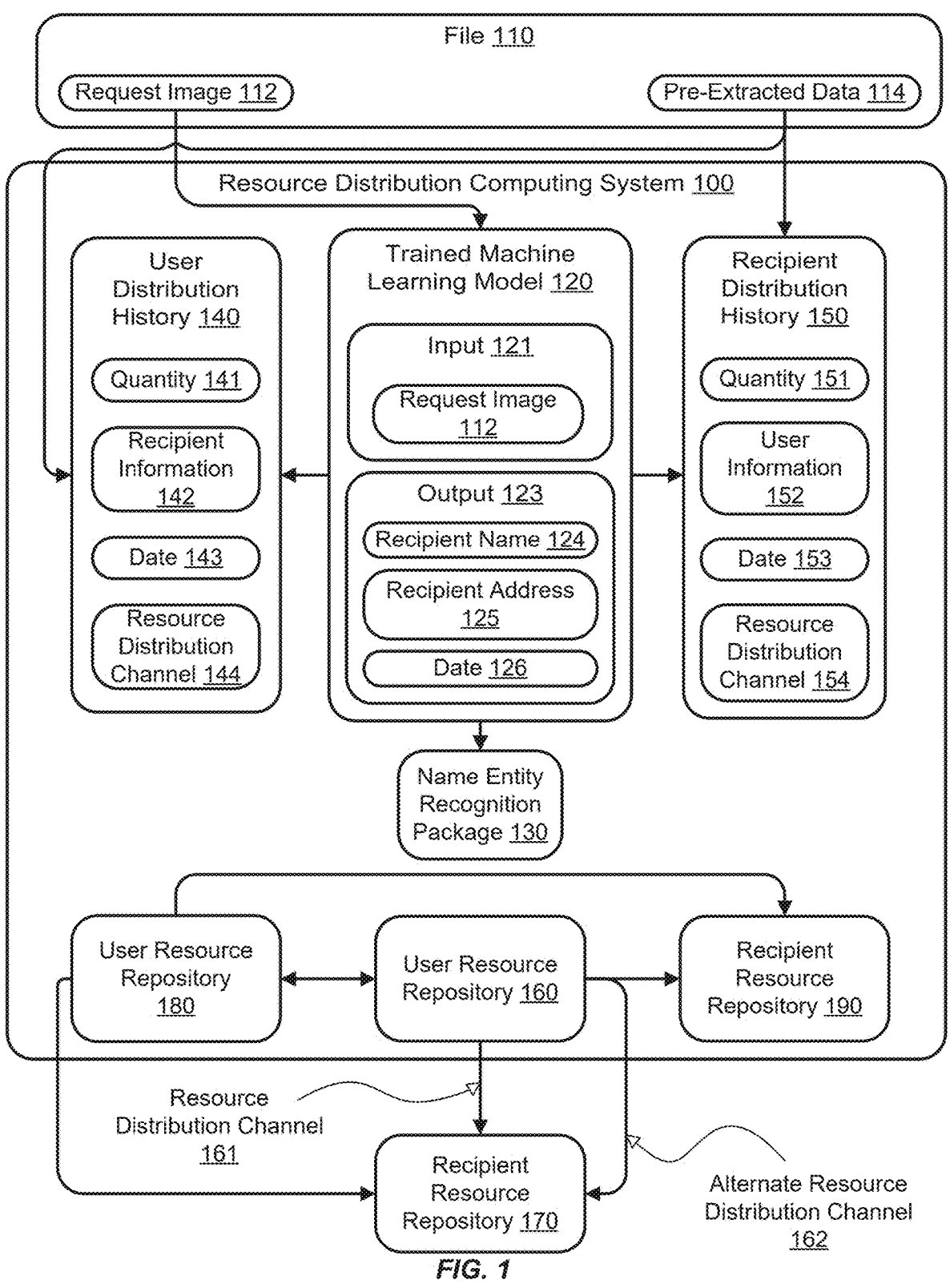
FIG. 1 is a block diagram of a system operable to distribute resources through an alternate resource distribution channel according to one aspect of the disclosure.

Certain aspects and features of the present disclosure relate to distributing resources through alternate resource distribution channels. In some examples, a system can receive a file including an image of a request to distribute resources from a first user to a recipient through a first resource distribution channel. The system can extract information from the image and determine alternate resource distribution channels for distributing the resources based on the extracted information. The system can then distribute resources to the recipient through the determined alternate resource distribution channel in a secure manner.

In other resource distribution systems, a user provides information that allows a recipient to request a distribution of resources. The information can include identifying information about an account of a user account number or a routing number of a user. An account number of a user and a routing number of a user could be used by the recipient, or by any other party with access to the information to attempt to fraudulently access resources belonging to a user. Alternate resource distribution channels may only require the user to provide the recipient encrypted information. In some instances, alternate resource distribution channels may be unknown to a user. In other instances, a user may be accustomed to initiating resource distributions in a particular manner. Aspects of the present disclosure allow for the distribution of resources through secure alternate resource distribution channels despite a user lacking knowledge of alternate resource distribution channels or a user habitually using a vulnerable resource distribution channel.

A resource distribution computing system can be a system for managing resources. Resources can be stored in resource repositories. Resource repositories may be identified by an account number. A user resource repository may be a resource repository associated with a user. A recipient resource repository may be a resource repository associated with a recipient. A resource may be considered distributed from a user when resources are removed from a user resource repository. A resource may be considered delivered to a recipient when resources are delivered to a recipient resource repository. A user resource repository and a recipient resource repository may be managed by different resource distribution computing systems.

A resource distribution channel may refer to the method by which resources are transferred from one resource repository to another resource repository. A method may be a specific combination of a user resource repository, a recipient resource repository, how a request to distribute resources is transmitted, and a path of the resources from the user repository to the recipient repository. In some embodiments, a user may be required to authorize a distribution through the alternate resource channel.

In one embodiment, the resource distribution computing system may be a financial resource distribution computing system, a resource may be a monetary sum, and a resource repository may be a bank account, or credit card. In this embodiment, a user may write a check to the recipient. The financial resource distribution computing system may receive an image of a check from a user to a recipient. The resource distribution computing system may determine that the recipient accepts credit cards or Automated Clearing House (ACH) payments. Based on determining that the recipient accepts credit card payments or ACH payments, the resource distribution computing system may send a credit card payment or ACH payment to the recipient.

In another example, the resource distribution computing system may be a postal service. In this example, resources may be the contents of a letter. A resource repository may be a mailbox. In this example, the resource distribution computing system may determine that the recipient is an organization. The resource distribution computing system may email the contents of the letter to the recipient in response to determining the recipient is an organization.

Distributing resources through alternate resource distribution channels can increase the security of resource distribution computing systems. For example, distribution requests can contain sensitive information that may be exposed and used to gain unauthorized access to resources. By automatically detecting and switching to a secure resource distribution channel can reduce exposure of potentially compromising information.

Additionally, verifying whether a recipient is an organization can improve the function of computers by reducing a computational load on a resource distribution computing system. Resource distribution computing systems may perform many (e.g., millions) resource distributions daily. In some resource distribution networks, configuring a resource repository to be compatible with encrypted requests is expensive. Due to cost, organizations are associated with a majority of the resource repositories compatible with encrypted requests rather than individuals. By initially determining whether a recipient is an organization or an individual, the resource distribution computing system may only proceed to determine whether the recipient is compatible with encrypted requests if the recipient is determined to be an organization, the resource distribution computing system may forgo determining alternate resource distribution channels if the recipient is determined to be an individual, thereby conserving computing resources. Organization verification can allow a resource distribution computing system to send a majority of resource distributions through alternate resource distribution channels with significantly less computational load than would be required to verify if every recipient is compatible with alternate resource distribution channels.

FIG. 1 is a block diagram of a system operable to reroute resource distributions through a secure alternate resource distribution channel 162, according to some embodiments. Resource distribution computing system 100 may be configured to receive a file 110. The file 110 may include a request image 112 or pre-extracted data 114, a request image 112 may be a scanned image of a paper request to distribute resources from a user to a recipient (e.g. a check). A recipient may be an entity designated as receiving resources from a user in the image of the request. A recipient may be an individual or an organization. An organization may be a business entity. Pre-extracted data 114 may be data that appears on the paper request and has been pre-extracted before arriving at a resource distribution system. For example, a bank of deposit may scan a check to generate the image of the request. The bank of deposit may also extract information about a user account number, a user routing number, a recipient account number, a recipient routing number, a quantity of resources requested, a request terminal, or a combination thereof. The bank of deposit may package the request image 112 and pre-extracted data 114 together into a file 110 and send file 110 to resource distribution computing system 100. Pre-extracted data 114 may define a resource distribution channel from a user resource repository 160 to a recipient resource repository 170.

Resource distribution computing system 100 may include user distribution history 140 or recipient distribution history 150. In some embodiments, the pre-extracted data 114 may be stored in the user distribution history 140 or the recipient distribution history 150. The user distribution history 140 may include entries for a distribution. Entries in user distribution history 140 may include a quantity 141, recipient information 142, a date 143, or a resource distribution channel 144. Recipient information 142 may include a name of a recipient, an account number of a recipient, or a routing number of a recipient. Similarly, the recipient distribution history 150 may include distribution entries. Entries in recipient distribution history 150 may include a quantity 151, user information 152, a date 153, or resource distribution channel 154. User information 152 may include a name of a user, an account number of a user, a routing number of a user, or request terminal.

Resource distribution computing system 100 may include trained machine learning model 120. Trained machine learning model 120 may receive request image 112 as input 121. Output 123 of trained machine learning model 120 may be extracted values from the request image 112 such as a recipient name 124, a recipient address 125, or date 126.

Resource distribution computing system 100 may store output in user distribution history 140 or recipient distribution history 150.

In some embodiments, the trained machine learning model 120 may employ techniques consistent with optical character recognition (OCR) or intelligent character recognition (ICR). OCR can involve preprocessing the request image 112, which can deskew the image, eliminate any digital image spots, or categorize light areas as background and dark areas as text. OCR can recognize text by pattern matching or by feature extraction. Pattern matching isolates individual characters, called glyphs, and compares the glyphs with stored glyphs. Feature extraction decomposes glyphs into features. Features can be lines, closed loops, line intersections, and line directions. Features can be used to find a best match of a stored glyph with similar features. ICR is similar to OCR but operates on words as opposed to individual characters. Trained machine learning model 120 can process the extracted characters into values and match the values to corresponding stored keys. Trained machine learning model 120 may also capture characters that OCR or ICR do not match as geometry objects.

In some embodiments, the resource distribution computing system 100 may, using a name-entity recognition package 130, determine that the recipient is an organization. In some embodiments, the name-entity recognition package 130 may determine that the recipient is an organization in response to determining the recipient address 125. In another embodiment, the name-entity recognition package 130 may include a second machine learning model that is trained to identify a name as a name belonging to an organization or an individual. The second machine learning model may be trained with training data including a name and a binary flag indicating if the name corresponds to an individual or an organization. The input of the second machine learning model may be a name, and the output of the second machine learning model may be a flag indicating if the name corresponds to an individual or an organization. For example, the flag may be a binary value where a flag value of zero represents individual, and a flag value of one represents an organization. In some embodiments, the name-entity recognition package 130 may compare the recipient name 124 and the recipient address 125 to entries in a known organization database. An entry in a known organization database may include an organization name and an organization address. Finding an entry in the known organization database where the organization name matches the recipient name 124 and the organization address matches the recipient address 125 indicates that the recipient is an organization. In some embodiments the name-entity recognition package 130 may use an online search engine.

In response to determining that the recipient is an organization, the resource distribution computing system 100 may determine an availability of an alternate resource distribution channel 162. The alternate resource distribution channel 162 may be a distribution channel including a new type of request. A new type of request may be a scheduled request. In some examples, a recipient initiates a request based on information provided by a user. A user may write a check to a recipient that the recipient may use to initiate a request, or a recipient may provide a user a single use encrypted token that a recipient may use to initiate a request. In other examples, a user may input an account number of a recipient, a routing number of a recipient, and a quantity to initiate a request. Alternate resource distribution channel 162 may be a distribution channel including a generated user resource repository. Alternate resource distribution channel 162 may be a distribution channel including a generated recipient resource repository. A generated resource repository may be a new checking account, a new savings account, or a new credit card account managed by resource distribution computing system 100.

In response to determining the alternate resource distribution channel 162, resource distribution computing system 100 may distribute resources from the user to the recipient through alternate resource distribution channel 162. The resource distribution computing system 100 may distribute resources to the recipient by generating and sending a command to a processing system to distribute resources from the user to the recipient. The processing system may be a system that batch processes ACH payments. The processing system may be a system that processes credit card payments. Resources may be distributed directly to a recipient resource repository. Resources may be sent in batches to a recipient resource repository. Resources may be sent to the recipient resource repository 170 through a third-party.

In some examples, user resource repository 160 and recipient resource repository 170 are pre-existing resource repositories. In some examples resource repositories may be a checking account, a savings account, or a credit card account. In some examples, a resource distribution computing system 100 may generate a user resource repository 180 or a recipient resource repository 190. The resource distribution computing system 100 may generate a resource repository in response to metrics meeting predetermined criteria. For example, a resource distribution computing system 100 may generate a resource repository in response to a sum of a quantity of resources in a user distribution history 140 or a quantity of resources in a recipient distribution history 150 exceeding a pre-set threshold. In other embodiments, a resource distribution computing system 100 may generate recurring distributions in response to detecting, based on user distribution history 140, distributions occurring at a regular interval.

In some embodiments the alternate resource distribution channel 162 includes an encrypted request. The encrypted request may be a single use token. Resource distribution computing system 100 may receive the encrypted request in a batch with other encrypted requests.

In one example, a resource distribution computing system 100 may create a credit card for the user and make payments to the recipient with the credit card instead of by check. In this example, resource distribution computing system 100 may be a resource distribution computing system of a bank where the user banks (user bank). Resource distribution computing system 100 may receive a file 110 from a bank where the recipient banks (bank of deposit). File 110 may include a scanned image of a check as request image 112. File 110 may also include pre-extracted data 114, or data that the other bank has already extracted from the check. The pre-extracted data 114 may include the account of the user, the routing number of the user, the quantity of resources, etc. Resource distribution computing system 100 may extract further information from the request image 112, such as the recipient name 124, the recipient address 125, and the date 126. Resource distribution computing system 100 may determine, that the recipient is an organization through a name-entity recognition package 130. In response to determining that the recipient is an organization, resource distribution computing system 100 may determine an alternate resource distribution channel 162. For example, the resource distribution computing system 100 may determine that the recipient accepts credit card payments. In response to determining that the recipient accepts credit card payments, resource distribution computing system 100 may generate a credit card account for the user and make credit card payments to the recipient.

Figure 2:
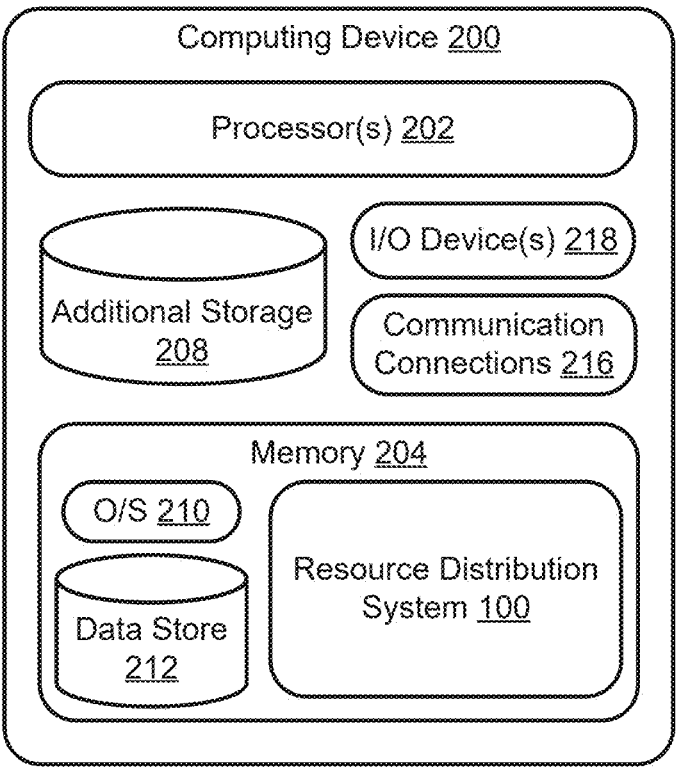
FIG. 2 is an example of a computing device that can distribute resources through alternate resource distribution channels according to one aspect of the disclosure.

FIG. 2 illustrates an example computing device that may distribute resources through distributions through an alternate resource distribution channel. Aspects of FIG. 2 are described with respect to the components in FIG. 1.

Computing device 200 may include memory 204. The memory 204 may store computer-executable instructions that are loadable and executable by the processor 202($s$) 202, as well as data generated during the execution of these programs. The memory 204 may be volatile (such as RAM) or non-volatile (such as ROM, flash memory, etc.). The computing device 200 may include additional storage 206, which may include removable storage or non-removable storage. The additional storage 206 may include, but is not limited to, magnetic storage, optical disks or tape storage. The disk drives and their associated computer-readable media may provide non-volatile storage of computer-readable instructions, data structures, program engines, and other data for the computing devices. In some implementations, the memory 204 or additional storage 206 may individually, or collectively, include multiple different types of memory, such as SRAM, DRAM, or ROM.

The memory 204 or additional storage 208 may be examples of computer-readable storage media. Computer-readable storage media may include volatile, or non-volatile, removable or non-removable media implemented in any method or technology for storage of information such as computer-readable instructions, data structures, program engines, or other data. In some embodiments, memory 204 and the additional storage 208 are examples of computer storage media. Memory 204 or additional storage 208 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which may be used to store the desired information, and which may be accessed by the computing device 200. Combinations of any of the above should also be included within the scope of computer-readable media. Computer-readable media may include computer-readable instructions, program engines, or other data transmitted within a data signal, such as a carrier wave, or other transmission. But, as used herein, computer-readable storage media does not include computer-readable communication media.

The memory 204 may include an operating system 210 and one or more data stores 212, or one or more application programs, engines, or services for implementing the features disclosed herein, such as the features provided by the resource distribution computing system 100.

The memory 204 may include instructions for the resource distribution computing system 100 of FIG. 1, which can be executable by the processor 202. By executing the instructions, the processor 202 can receive a file 110. File 110 may include an image of a request or pre-extracted data 114. The processor 202 may execute a trained machine learning model 120 to extract a recipient name 124, a recipient address 125, or a date 126 from request image 112. Processor 202 may determine that the recipient is an organization based on the recipient name 124 or recipient address 125. Processor 202 may determine an alternate resource distribution channel 162 in response to determining the recipient is an organization. The processor 202 can then distribute resources through the alternate resource distribution channel 162.

The processor 202 can store information in memory 204. The processor 202 can receive information from the memory 204. The information may include user distribution history 140 or recipient distribution history 150. The processor 202 can distribute resources to or from resource repositories 160, 180, or 190. The processor 202 can distribute resources to recipient resource repository 170.

Computing device 200 may also contain communications connection(s) 216 that allow computing device 200 to communicate with a stored database, another computing device, a server, user terminals or other devices (e.g., via one or more networks, not depicted). Computing device 200 may also include I/O device(s) 218, such as a keyboard, a mouse, a pen, a voice input device, a touch input device, a display, speakers, a printer, etc.

Figure 3:
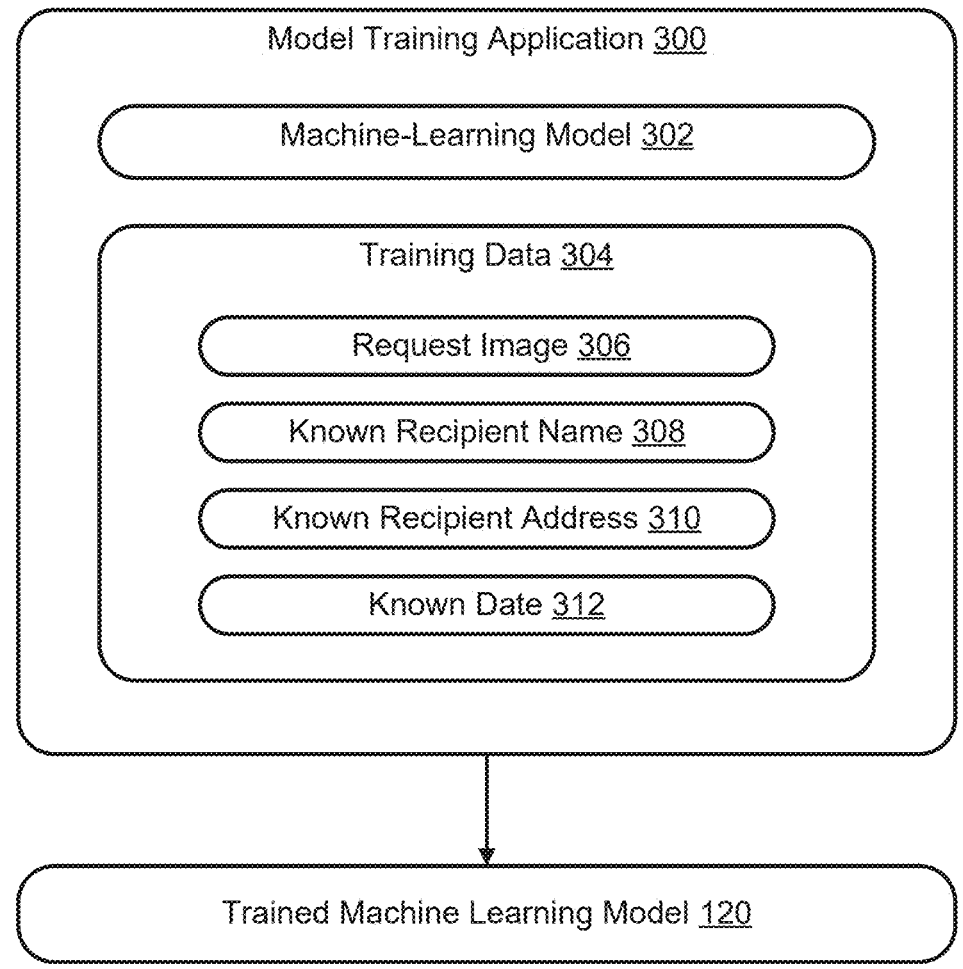
FIG. 3 is a block diagram of an example of a model-training application that can be implemented to train a machine-learning model according to one aspect of the disclosure.

FIG. 3 is a block diagram of an example of a model-training application 300 that may be implemented to train a machine-learning model 302 to generate a trained machine-learning model, such as the trained machine learning model 120 of FIG. 1. The model-training application 300 may be a part of the computing device 200 of FIG. 2, or the model-training application 300 may be separate and remote from the computing device 200 of FIG. 2. Training the machine-learning model 302 may transform the machine-learning model 302 from an untrained state to a trained state (i.e., to a trained machine-learning model).

A "machine learning model" (ML model) may refer to a software engine configured to be run on one or more processors to extract text from an image. The text may include a recipient name 124, a recipient address 125, or a date 126. An ML model may be generated using sample data (e.g., training data) to make predictions on test data. One example is an unsupervised learning model. Another example type of model is supervised learning that may be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSMAY), random forest algorithm, support vector machine (SVM), or any model described herein. Supervised learning models may be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks may employ using wide and tensorized deep architectures, convolutional layers, dropout, various neural activations, and regularization steps.

Various techniques may be utilized to train the machine-learning model 302. For example, training data 304 may be provided to the machine-learning model 302 in an iterative manner to enable the machine-learning model 302 to identify trends or relationships in the training data 304. The machine-learning model training may be supervised training, unsupervised training, or a semi-supervised training. Parameter or hyperparameter adjustment may also be utilized to minimize a loss function of the machine-learning model 302.

Training the machine-learning model 302 may include accessing the training data 304, which may be stored, for example, at the computing device 200 or at a database or another storage location that is remote from but accessible by the computing device 200. The training data may include a request image 306, tagged with a known recipient name 308, a known address 310, or a known date 312. The machine learning model may extract values from the request image 306. The values may be names, addresses, account numbers, quantities, signatures, routing numbers, or memos. Each value that the machine learning model returns may be associated with a corresponding x-y coordinate of where in the request the value was extracted. Rules may be applied to the machine learning model to match a value with a key by comparing x-y coordinates of a first value with x-y coordinates of a second value. For example, a machine learning model may return two addresses. The machine learning model may be trained to assign an address value with a key of recipient address 125 if the machine learning model extracts two address values and the second address value is associated with a lower y coordinate than the first address value.

Various fitting, estimation, or other model-training optimization techniques may be used to ensure that, upon evaluation, the predictive output of the trained machine learning model 120 is accurate given the input data (i.e., to minimize the loss function). The resulting trained machine learning model 120 may then be deployed for application to newly received input data, as described above.

Figure 4:
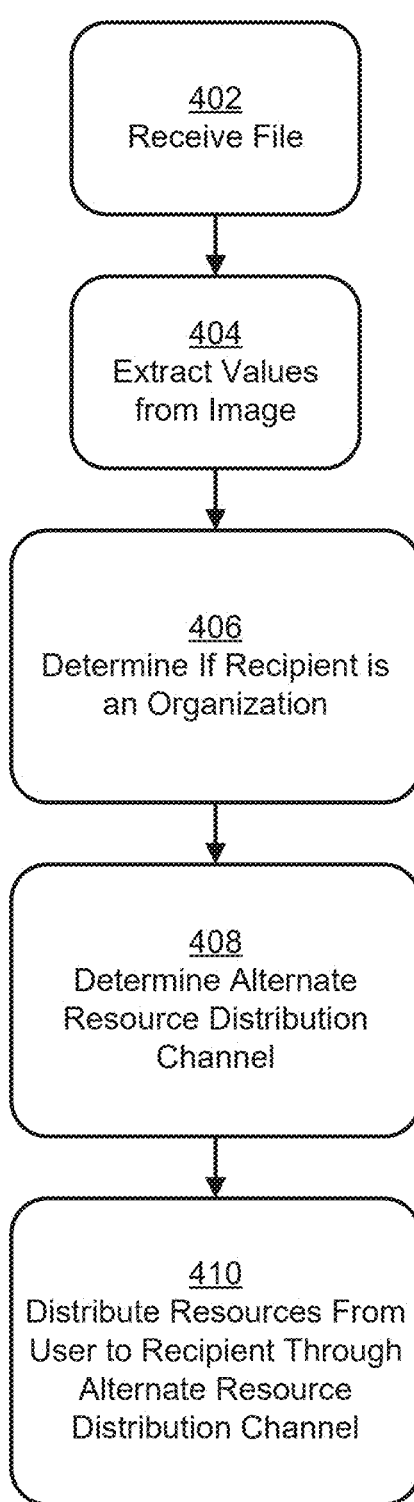
FIG. 4 is a flowchart of distributing resources through an alternate resource distribution channel according to one aspect of the disclosure.

FIG. 4 is a flowchart of distributing resources through an alternate resource distribution channel 162 according to some examples. Aspects of FIG. 4 are described with respect to the components in FIGS. 1-3, but other implementations are possible. At block 402, processor 202 can receive a file 110 including an image and pre-extracted data 114 from the image. The image can be the request image 112. The file 110 may be an encrypted file. Pre-extracted data 114 may include a user account number, a user routing number, a recipient account number, a recipient routing number, a quantity of resources requested, or a request terminal.

At block 404, processor 202 can, by executing a trained machine learning model 120, extract values from the image. The processor 202 can determine what values to extract from the image based on what values include the pre-extracted data 114. The trained machine learning model 120 executed by the processor 202 can be trained to determine keys associated with extracted values based on a comparison of location of a first value in the image with a location of a second value in the image. For example, the trained machine learning model 120 can extract a first address and a second address from the request, each address being associated with a coordinate of where the address appeared in the image. The trained machine learning model 120 can be trained to associate the key of a recipient address 125 with the address value that has a higher y-coordinate. The trained machine learning model 120 can also be trained to only associate a value with certain keys based on the location of the value falling within a certain range. For example, a user address key can only be associated with a value appearing in the top third of the image, and recipient address 125 key can only be associated with a value appearing in the middle third of the image.

At block 406, processor 202 can determine if the recipient is an organization. The processor 202 can execute a name-entity recognition package 130 to determine if the recipient is an organization. The name-entity recognition package 130 can be stored in a memory. In some examples, the name-entity recognition package 130 can be a machine learning model trained with inputs of a name and a known organization status. In other examples, the name-entity recognition package 130 can be a model configured to infer an organization status based on determining a recipient address 125 value in the image. In another example, the name-entity recognition package 130 can be a search engine configured to search a local database or a database hosted by an external server.

At block 408, processor 202 can determine an alternate resource distribution channel 162. The processor 202 can determine the alternate resource distribution channel 162 in response to determining that the recipient is the organization. The processor 202 can generate additional resource repositories, 180 or 190 in response to determining alternate resource distribution channel 162. The processor 202 can also configure resource repositories, 180 or 190, to distribute resources in the alternate resource distribution channel 162.

At block 410, the processor 202 can distribute resources from the user to the recipient through alternate resource distribution channel 162. The processor 202 can distribute resources from a user resource repository of the user to a recipient resource repository of the recipient. The recipient resource repository can be part of another resource distribution computing system. In some embodiments, processor 202 can distribute resources from a user resource repository of the resource distribution computing system to a recipient resource repository of the same resource distribution computing system. The processor 202 may distribute the resources by forwarding the file 110 to a distribution processing model or by issuing a command authorizing the distribution processing model to allow the recipient to access the resource. The distribution processing model can be an automated clearing house system that automatically distributes the resource upon receiving the file 110 or the command. Resources can be distributed directly to the recipient. Resources can be distributed to the resource distribution system where the recipient is a user. Resources can be distributed to other resource distribution systems in batches with instructions for the final destination of the resources distribution system. Distributing resources can be done by issuing a command to another resource distribution system to distribute the resources.

Figure 5:
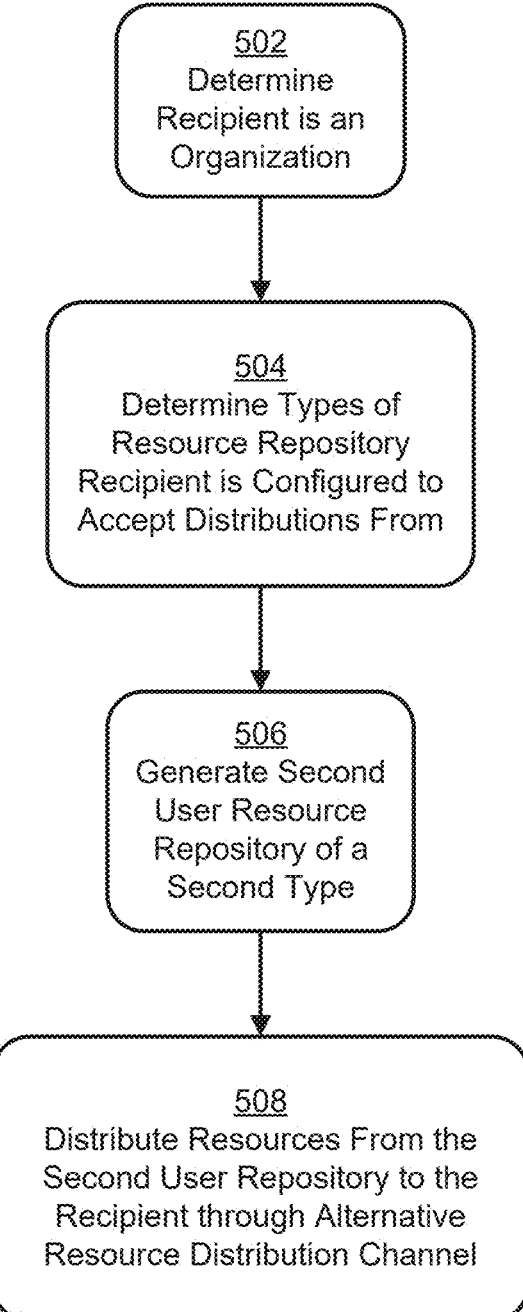
FIG. 5 is a flowchart of generating a second user resource repository and distributing resources from the second user resource repository according to one aspect of the disclosure.

FIG. 5 is a flowchart of generating a second user resource repository and distributing resources from the second user resource repository according to some examples. Aspects of FIG. 5 are described with respect to the components in FIG.

1-4. At block 502, a processor 202 can determine that a recipient is an organization. Processor 202 can determine that a recipient is an organization by executing a name-entity recognition package 130. The processor 202 can be configured to determine that a recipient is a resource in the same manner described in block 406.

At block 504, the processor 202 can determine types of resource repositories from which the recipient resource repository is able to accept distributions. In some embodiments, a recipient resource repository can be able to accept distributions from a plurality of types of resource repositories (e.g., a checking account, a savings account, or a credit card account). In other embodiments, a recipient resource repository can be configured to accept distributions from only a single type of resource repository.

At block 506, the processor 202 can generate a second user resource repository in response to determining the recipient resource repository is able to accept payments from multiple types of resource repositories. The user resource repository can be a resource repository of a first type that the recipient resource repository is able to accept, and the second user resource repository can be a resource repository of a second type that the recipient resource repository is able to accept. For example, the first type of resource repository can be a checking account, and a second type of resource repository can be a credit card account.

At block 508, the processor 202 can distribute resources from the second user resource repository to the recipient resource repository through alternate resource distribution channel 162. The alternate resource distribution channel 162 can be end-to-end encrypted.

Figure 6:
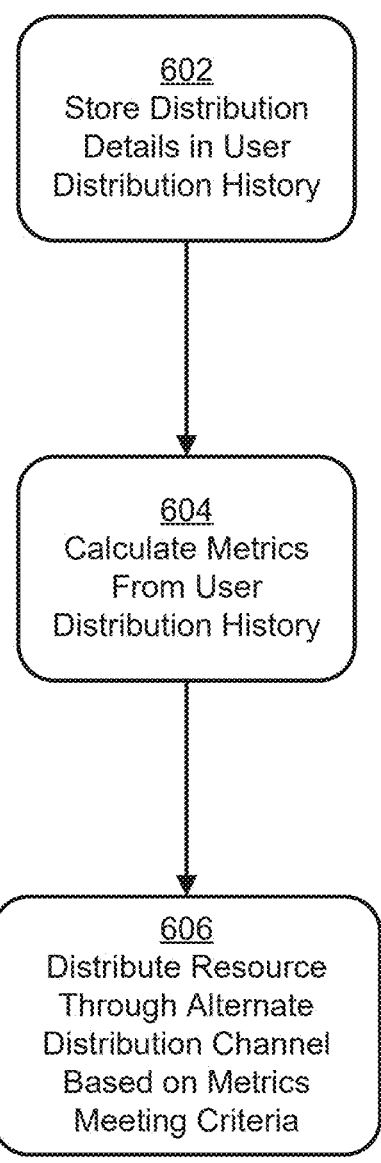
FIG. 6 is a flowchart of distributing resources through an alternate resource distribution channel based on metrics from a user distribution history meeting pre-set criteria according to one aspect of the disclosure.

FIG. 6 is a flowchart of distributing resources through an alternate resource distribution channel 162 based on metrics from a user distribution history 140 meeting pre-set criteria according to some examples. Aspects of FIG. 6 are described with respect to the components in FIG. 1-2, but other implementations are possible. At block 602, a processor (e.g., the processor 202 in FIG. 2) can store distribution details in a user distribution history 140. In some examples, user distribution history 140 includes entries corresponding to a single distribution. The components, or distribution details, of an entry can include a quantity 141, recipient information 142, a date 143, or a resource distribution channel.

At block 604, the processor 202 can calculate metrics based on the user distribution history 140. A metric can be a sum of quantities, a sum of quantities distributed to organizations configured to receive distributions from a different type of resource repositories, a sum of quantities distributed in a predetermined period, or a number of distributions of a same quantity distributed to the same recipient separated by regular intervals. Each metric can be associated with a unique threshold.

At block 606, the processor 202 can distribute resources through an alternate resource distribution channel 162 based on the metrics meeting criteria. The processor 202 can determine that a metric has exceeded the threshold associated with the metric. The processor 202 can determine the alternate resource distribution channel 162 based on which metric exceeded the threshold associated with the metric. For example, the processor 202 can determine a sum of quantities distributed to organizations configured to receive distributions from a different type of resource repository exceeds the associated threshold, and in response, can generate a second user resource repository of a second type corresponding to the different type of resource repository. The processor 202 can then distribute resources from the second user resource repository to the recipient resource repository.

FIG. 7 is a flowchart of distributing resources using an alternate resource distribution channel based on past distributions according to some examples. Aspects of FIG. 7 are described with respect to the components and processes in FIG. 1-6, but other implementations are possible. At block 702, the processor 202 can receive, from a device, a file 110 including an image 112 of a request to distribute a resource through a first resource distribution channel. The resource is to be distributed from a user to a recipient, as indicated in the image 112. The file 110 also includes a set of pre-extracted data from the image that includes at least a quantity of the resource that is to be distributed. A trained machine learning model may extract values from the image that include a name and address of the recipient. The name and address can be determined based on a relationship between a first location of a first value in the image 112 an a second location of a second value in the image 112.

At block 704, processor 202 can retrieve, in response to receiving the file 110, at least one past distribution to the recipient. The at least one past distribution can be stored as distribution details in a recipient distribution history 150. In some examples, the recipient distribution history 150 includes entries corresponding to a single distribution or multiple distributions from one or more users that may be the same or different user than the user associated with the request. The components, or distribution details, of an entry can include a quantity 151, user information 152, a date 153, a request terminal, or a resource distribution channel 154.

At block 706, processor 202 can determine, based on the at least one past distribution, an alternate resource distribution channel 162 to distribute the resource from the user to the recipient. For example, based on determining that the at least one past distribution was received by the recipient via a different type of resource distribution channel than the first resource distribution channel, the processor 202 can determine that the different type of resource distribution channel can be the alternate resource distribution channel for distributing the resource from the user to the recipient. The different type of resource distribution channel may be a different type of resource repository than a first type of resource repository indicated in the request. So, the processor 202 can generate a second user resource repository that is the different type and user the second user resource repository for the distribution.

In some examples, the processor 202 can calculate metrics based on the recipient distribution history 150 to determine the alternate resource distribution channel 162. A metric can be a sum of quantities, a sum of quantities distributed to the recipient, a sum of quantities distributed in a predetermined period, a sum of quantities distributed using a specific type of request terminal, or a number of distributions of a same quantity distributed from the same separated by regular intervals. Each metric can be associated with a unique threshold. In a particular example, the request may be to distribute the resource to a first recipient resource repository of a first resource distribution system. The processor 202 can record the quantity of the request to the recipient distribution history 150 and determine the sum of quantities of resources indicated in the recipient distribution history 150. If the sum of quantities exceeds a pre-set threshold, the processor 202 can generate a second recipient resource repository of a second resource distribution system that can be used for the distribution of the resource.

The processor 202 can determine from a user distribution history 140, that the user requests distributions to the recipient at a regular interval. The processor 202 can then schedule the distribution from the user to the recipient via the alternate distribution channel for a next occurrence of the regular interval. Additionally or alternatively, the processor 202 may record the quantity of the resource to the user distribution history 140 and determine a sum of quantities distributed from the user to the recipient that is stored in the user distribution history 140. If the sum of quantities distributed from the user to the recipient exceeds a pre-set threshold, the alternate resource distribution resource distribution channel can be used.

At block 708, processor 202 can control a distribution of the resource from the user to the recipient through the alternate resource distribution channel 162. The processor 202 may perform or cause the distribution using the second user resource repository, the second recipient resource repository, or at the regular interval, as described above. The processor 202 can control the distribution as described herein above in FIG. 4.

Some or all the process (or any other processes described herein, or variations, or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The various embodiments further may be implemented in a wide variety of operating environments, which in some cases may include one or more user computers, computing devices or processing devices which may be used to operate any of a number of applications. User or client devices may include any of a number of general-purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network may be, for example, a local area network, a wide-area network, a virtual private network, the Internet, an intranet, an extranet, a public switched telephone network, an infrared network, a wireless network, and any combination thereof.

Storage media computer readable media for containing code, or portions of code, may include any appropriate media known or used in the art, including storage media and communication media, such as but not limited to volatile and non-volatile, removable and non-removable media implemented in any method or technology for storage or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which may be used to store the desired information and which may be accessed by a system device.

The specification and drawings are, accordingly, to be regarded in an illustrative rather than a restrictive sense. Various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

Certain embodiments of this disclosure are described herein, including the best mode known to the inventors for carrying out the disclosure. Variations of those preferred embodiments may become apparent to those of ordinary skill in the art upon reading the foregoing description.

That which is claimed is:

1. A system comprising:
a processor; and
a memory communicatively coupled to the processor, the memory including instructions that configure the processor to perform operations comprising:
    receiving, from a device, a file comprising an image of a physical check requesting a transaction to distribute, through a first transaction channel associated with the physical check, a resource from a first user resource repository of a user to a recipient and a set of pre-extracted data related to the transaction from the image comprising at least a quantity of the resource;
    extracting, using a trained machine learning model configured for processing images of physical checks, a plurality of values from the image including a name of the recipient and an address of the recipient, the name and the address being determined based on determining a spatial relationship between a first location of a first value in the image and a second location of a second value in the image, wherein the trained machine learning model is trained to recognize printed fields or handwritten fields in a check image;
    determining, based on a comparison of the name of the recipient and the address of the recipient to a database of organizations, a match between an entry of an organization in the database and the name and the address;
    determining, based on the match, that the recipient is the organization;
    determining, in response to determining that the recipient is the organization, an alternate transaction channel distinct from the first transaction channel to distribute the resource from the user to the recipient for the transaction based on determining that the recipient accepts transactions via the alternate transaction channel, the alternate transaction channel being associated with a credit card;
    generating, in response to determining that the recipient is the organization and accepts transactions via the alternate transaction channel, a recipient resource repository;
    determining that a sum of quantities of resources distributed to the recipient over a predetermined period as recorded in a recipient distribution history exceeds a pre-set threshold;
    in response to determining that the sum exceeds the pre-set threshold, generating a second user resource repository associated with the alternate transaction channel for the user; and
    distributing, for the transaction, the resource from the user to the recipient through the alternate transaction channel by distributing the resource from the second user resource repository to the recipient resource repository in response to determining the alternate transaction channel.

2. The system of claim 1, wherein the request is to distribute the resource to a first recipient resource repository of a first resource distribution system, and the memory further comprises instructions to the processor to perform operations further comprising:
    recording the quantity of the resource and the name of the user to the recipient distribution history;
    determining the sum of quantities of resources in the recipient distribution history;

generating, in response to the sum of quantities of resources distributed to the recipient exceeding the pre-set threshold, the recipient resource repository as a second recipient resource repository of a second resource distribution system; and distributing the resource from the user to the recipient by distributing the resource to the second recipient resource repository of the second resource distribution system.

3. The system of claim 1, wherein the alternate transaction channel is an encrypted resource distribution channel.

4. The system of claim 1, wherein the plurality of values extracted from the file further includes a date and the memory further includes instructions that configure the processor to perform operations further comprising:

recording the quantity of the resource, the name of the user, and the date to a user distribution history;

identifying, based on the user distribution history, distributions from the user to the recipient at a regular interval;

scheduling a distribution from the user to the recipient for a next occurrence of the regular interval; and distributing the resource from the user to the recipient at the next occurrence of the regular interval.

5. The system of claim 1, wherein the memory further includes instructions that configure the processor to perform operations further comprising:

recording the quantity of the resource and the name of the recipient to a user distribution history.

6. A method comprising:

receiving, from a device, a file comprising an image of a physical check requesting a transaction to distribute, through a first transaction channel associated with the physical check, a resource from a first user resource repository of a user to a recipient and a set of pre-extracted data related to the transaction from the image comprising at least a quantity of the resource;

extracting, using a trained machine learning model configured for processing images of physical checks, a plurality of values from the image including a name of the recipient and an address of the recipient, the name and the address being determined based on determining a spatial relationship between a first location of a first value in the image and a second location of a second value in the image, wherein the trained machine learning model is trained to recognize printed fields or handwritten fields in a check image;

determining, based on a comparison of the name of the recipient and the address of the recipient to a database of organizations, a match between an entry of an organization in the database and the name and the address;

determining, based on the match, that the recipient is the organization;

determining, in response to determining that the recipient is the organization, an alternate transaction channel distinct from the first transaction channel to distribute the resource from the user to the recipient for the transaction based on determining that the recipient accepts transactions via the alternate transaction channel, the alternate transaction channel being associated with a credit card;

generating, in response to determining that the recipient is the organization and accepts transactions via the alternate transaction channel, a recipient resource repository;

determining that a sum of quantities of resources distributed to the recipient over a predetermined period as recorded in a recipient distribution history exceeds a pre-set threshold;

in response to determining that the sum exceeds the pre-set threshold, generating a second user resource repository associated with the alternate transaction channel for the user; and distributing, for the transaction, the resource from the user to the recipient through the alternate transaction channel by distributing the resource from the second user resource repository to the recipient resource repository in response to determining the alternate transaction channel.

7. The method of claim 6, wherein the request is to distribute the resource to first a recipient resource repository of a first resource distribution system, and the method further comprises:

recording the quantity of the resource and the name of the user to the recipient distribution history;

determining the sum of quantities of resources in the recipient distribution history;

generating, in response to the sum of quantities of resources distributed to the recipient exceeding the pre-set threshold, the recipient resource repository as a second recipient resource repository of a second resource distribution system; and distributing the resource from the user to the recipient by distributing the resource to the second recipient resource repository of the second resource distribution system.

8. The method of claim 6, wherein the alternate transaction channel is an encrypted resource distribution channel.

9. The method of claim 6 further comprising:

identifying, based on a user distribution history, distributions from the user to the recipient at a regular interval;

scheduling a distribution from the user to the recipient for a next occurrence of the regular interval; and distributing the resource from the user to the recipient at the next occurrence of the regular interval.

10. The method of claim 6 further comprising:

recording the quantity of the resource and the name of the recipient to a user distribution history.

11. A non-transitory computer-readable medium comprising instructions that are executable by a processor for causing the processor to perform operations comprising:

receiving, from a device, a file comprising an image of a physical check requesting a transaction to distribute, through a first transaction channel associated with the physical check, a resource from a first user resource repository of a user to a recipient and a set of pre-extracted data related to the transaction from the image comprising at least a quantity of the resource;

extracting, using a trained machine learning model configured for processing images of physical checks, a plurality of values from the image including a name of the recipient and an address of the recipient, the name and the address being determined based on determining a spatial relationship between a first location of a first value in the image and a second location of a second value in the image, wherein the trained machine learning model is trained to recognize printed fields or handwritten fields in a check image;

determining, based on a comparison of the name of the recipient and the address of the recipient to a database of organizations, a match between an entry of an organization in the database and the name and the address;

determining, based on the match, that the recipient is the organization;

determining, in response to determining that the recipient is the organization, an alternate transaction channel distinct from the first transaction channel to distribute the resource from the user to the recipient for the transaction based on determining that the recipient accepts transactions via the alternate transaction channel, the alternate transaction channel being associated with a credit card;

generating, in response to determining that the recipient is the organization and accepts transactions via the alternate transaction channel, a recipient resource repository;

determining that a sum of quantities of resources distributed to the recipient over a predetermined period as recorded in a recipient distribution history exceeds a pre-set threshold;

in response to determining that the sum exceeds the pre-set threshold, generating a second user resource repository associated with the alternate transaction channel for the user; and distributing, for the transaction, the resource from the user to the recipient through the alternate transaction channel by distributing the resource from the second user resource repository to the recipient resource repository in response to determining the alternate transaction channel.

12. The non-transitory computer-readable medium of claim 11, wherein the request is to distribute the resource to a first recipient resource repository of a first resource distribution system, and the operations further comprise:

recording the quantity of the resource and the name of the user to the recipient distribution history;

determining the sum of quantities of resources in the recipient distribution history;

generating, in response to the sum of quantities of resources distributed to the recipient exceeding the pre-set threshold, the recipient resource repository as a second recipient resource repository of a second resource distribution system; and distributing the resource from the user to the recipient by distributing the resource to the second recipient resource repository of the second resource distribution system.

13. The non-transitory computer-readable medium of claim 11, wherein the alternate transaction channel is an encrypted resource distribution channel.

14. The non-transitory computer-readable medium of claim 11, wherein the plurality of values extracted from the image further include a date, and the operations further comprise:

recording the quantity of the resource, the name of the user, and the date to a user distribution history;

identifying, based on the user distribution history, distributions from the user to the recipient at a regular interval;

scheduling a distribution from the user to the recipient for a next occurrence of the regular interval; and distributing the resource from the user to the recipient at the next occurrence of the regular interval.

* * * * *